Oct. 8, 1968          H. O. ANGER                3,405,233
      ISOTOPE SCANNER WHICH CREATES X-RAY AND GAMMA
                RADIATION IMAGES SIMULTANEOUSLY
Filed July 13, 1965                          3 Sheets-Sheet 1
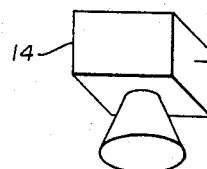
Fig. 1.
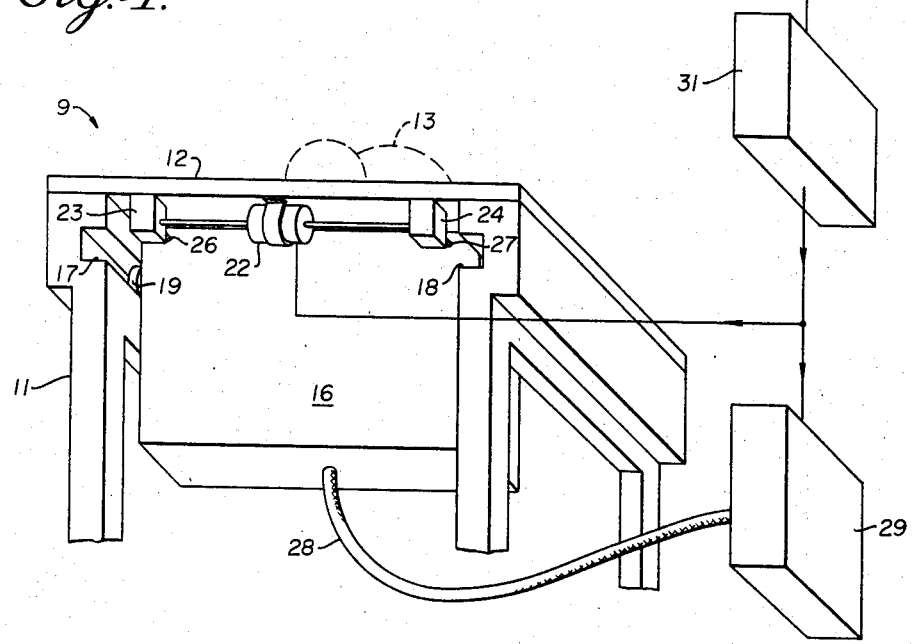
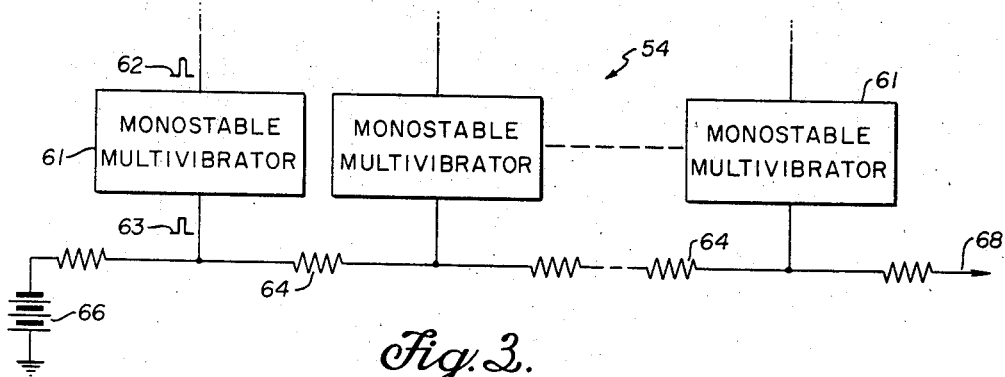
Fig. 3.
INVENTOR.
HAL O. ANGER
BY
ATTORNEY.

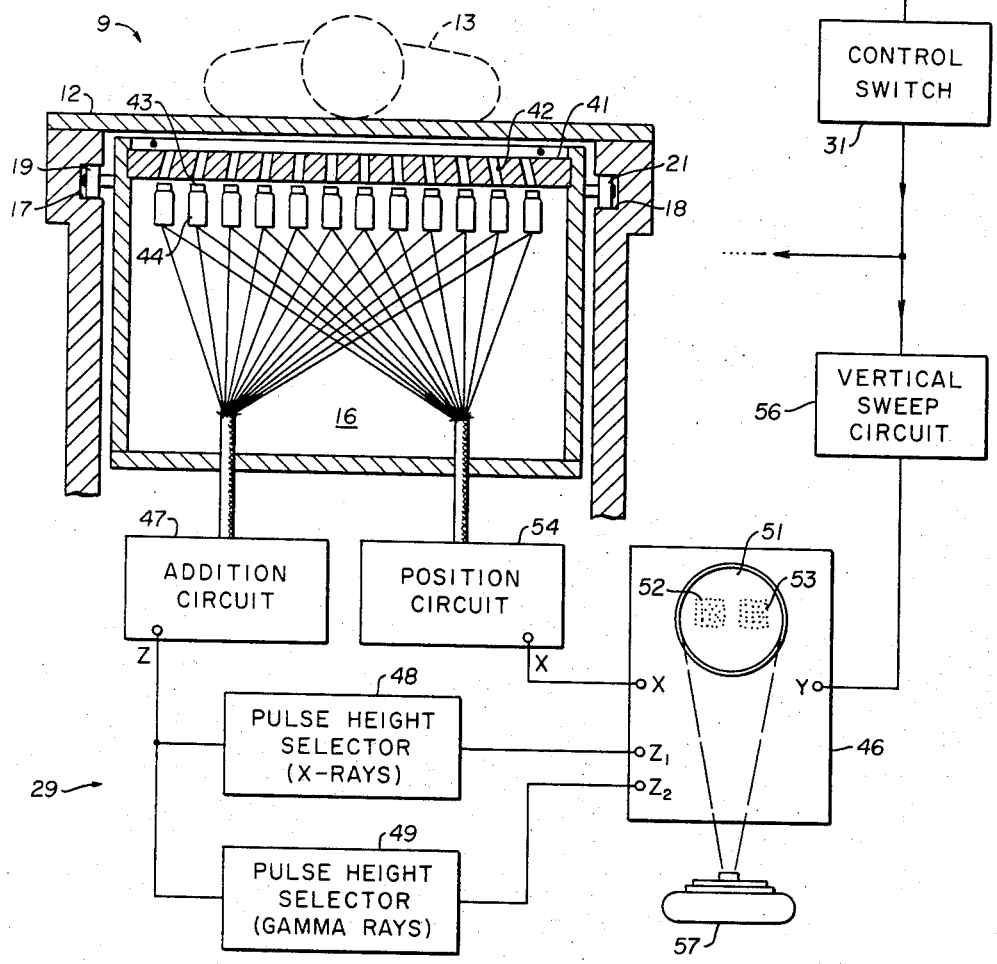

United States Patent Office 3,405,233
Patented Oct. 8, 1968

3,405,233
ISOTOPE SCANNER WHICH CREATES X-RAY AND GAMMA RADIATION IMAGES SIMULTANEOUSLY
Hal O. Anger, Oakland, Calif., assignor to the United States of America as represented by the United States Atomic Energy Commission
Filed July 13, 1965, Ser. No. 471,773
11 Claims. (Cl. 178—6.8)

ABSTRACT OF THE DISCLOSURE

A radiation detecting device for creating an image showing the distribution of a gamma emitting radioactive substance in a patient, together with an X-ray image formed concurrently, to aid in accurately determining the location of the radioactive substance. A row of radiation sensing devices are scanned along the patient, detecting both X-rays and gamma-rays, with pulse-height analyzers to separate the X-ray and gamma-ray signals received from the detectors so that both an X-ray image and a gamma-ray image are formed.

---

This invention relates to an improvement in a radioactivity detector and more particularly to apparatus for detecting the position of a radioactive tracer in a human body for diagnosis of some particular condition therein. The invention descibed herein was made in the course of, or under, Contract W–7405–eng–48 with the Atomic Energy Commission.

The present invention is an improvement of an isotope scanner as described in U.S. Patent No. 2,776,377 dated Jan. 1, 1957, to the present inventor. To use such an isotope scanner, a radioactive isotope is introduced into a patient, generally orally. Certain isotopes tend to collect in certain type of tissue. For instance, the radioactive isotope of iodine tends to collect in the thyroid gland. The subject is positioned adjacent a linear array of nuclear particle detectors with associated collimation means so that each detector will receive particles from only a small portion of the subject; the line of detectors collectively providing a continuous scan line with each detector individually sensitive only to a short portion of the line. The detectors are moved transversely with respect to the line of detectors to obtain a complete scan of the subject. Using associated electronic apparatus, a resultant picture of the radioactivity in the subject is provided in which the regions where the radioactive material has accumulated are indicated.

Such a picture is quite useful in the diagnosis of various medical conditions in the subject, however it has been found that usefulness of the picture can be greatly increased if the location of a region of high radioactivity can be accurately determined relative to parts of the body. Present isotope scanners only provide a picture of the radioactivity distribution with no identifying body structure.

The present invention is an improved isotope scanner in that in addition to the picture of radioactivity distribution, a separate X-ray image of the subject's skeletal structure is made simultaneously. By having a separate picture there is no possibility of the skeletal image blanking or obscuring details of the radioactivity distribution picture, yet the pictures may be superimposed so that the skeletal image may be used as a location reference. The location information obtained by the present invention may be used, for instance, as an aid in surgery on the subject.

It is an object of the present invention to provide an improved isotope scanner for aiding in the diagnosis, study or treatment of physiological conditions in a patient.

It is an object of the present invention to provide improved apparatus for diagnosing physiological conditions in a patient.

It is another object of the present invention to provide an improved means for accurately locating a region in the body in which a radioactive isotope has accumulated.

It is another object of the present invention to provide an isotope scanner in which a picture of both radioactivity distribution and skeletal structure are obtained.

It is another object of the present invention to provide separate images of radioactivity distribution and of skeletal structure in a patient which images may be superimposed to determine positional relationship of a radioactive region.

The invention will be better understood by reference to the accompanying drawing of which:

FIGURE 1 is a general view of the isotope scanner in use with a human subject,

FIGURE 2 is a section view of the radiation sensing unit in the isotope scanner with associated circuitry being shown in block form, FIGURE 3 is a detailed circuit diagram in block form of a position circuit of FIGURE 2.

Figure 4:
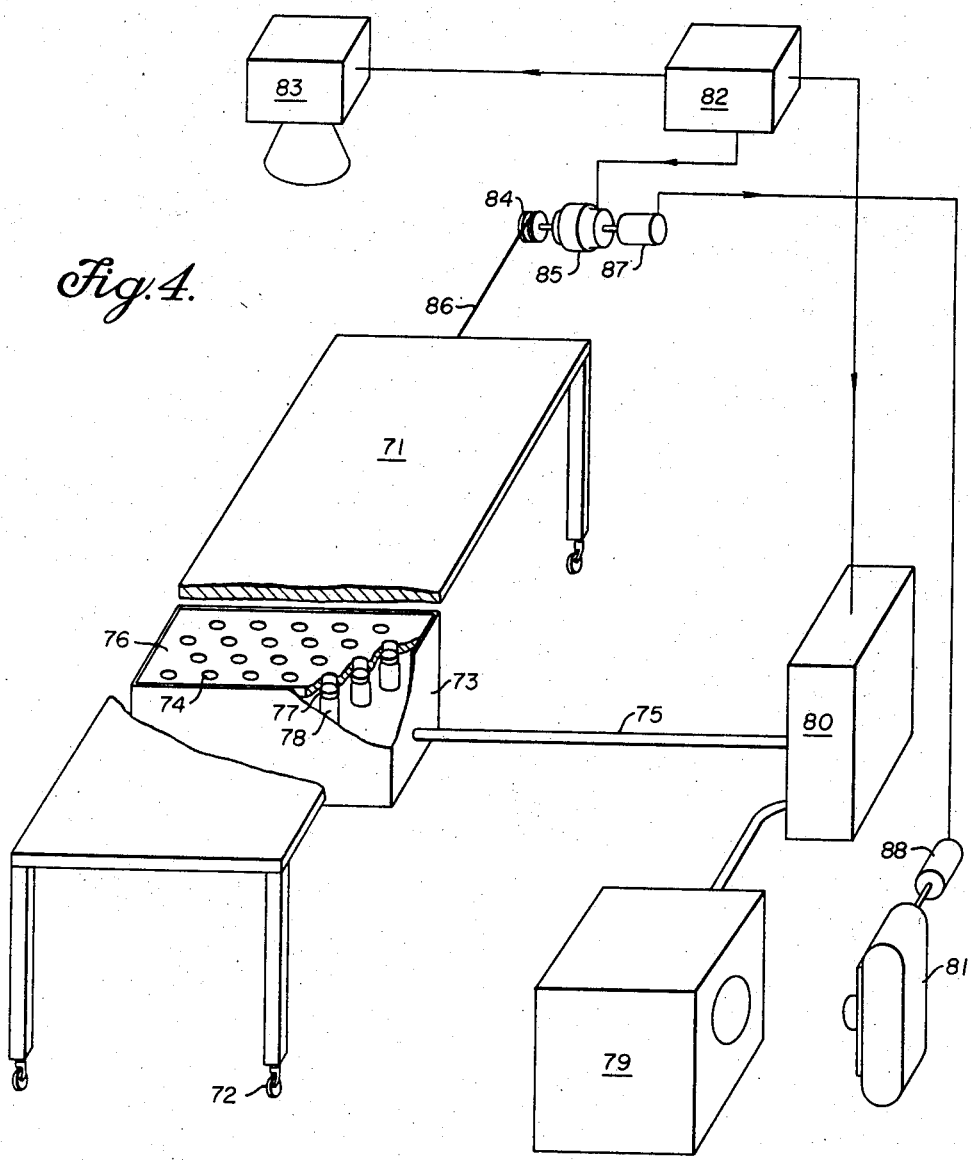
FIGURE 4 is a general view of another embodiment of the invention.

Referring now to FIGURE 1, there is shown a table 9 having a frame 11 supporting a table top 12, the top being made of a material transparent to X-rays and gamma rays. A subject 13, after having ingested a quantity of a gamma emitting radioactive isotope, reclines on the table top 12. A source of soft X-rays 14, that is, low frequency or long wavelength rays, is directed at the subject, the X-ray source being disposed above the table top 12 so that the X-rays pass through the subject to a movable detector assembly 16. The detector assembly 16 is a linear array of radiation detectors responding only to radiation from a thin segment of the subject. A pair of long grooves 17 and 18 provided immediately below the table top 12 in opposite sides of the frame 11 function as tracks in which the detector assembly 16 can be moved on rollers 19 and 21 to obtain complete coverage of the subject 13. A motor 22, affixed to the bottom side of the table top, is coupled through gear boxes 23 and 24 to long drive screws 26 and 27 which move the assembly 16 along the grooves 17 and 18.

As discussed in detail hereinafter, X-rays and gamma rays are detected in the assembly 16, resulting electrical pulse signals being applied through a flexible cable 28 to an electronic chassis 29. The operation is initiated by a control box 31 which simultaneously activates X-ray source 14, motor 22, and electronic chassis 29.

In operation, the detector is slowly moved along the length of the table 9, in the course of a scan detecting both the X-rays that pass through the body of the subject 13 and the gamma rays which emanate from the isotopes previously ingested by the subject. As the various gamma and X-rays are detected, corresponding images are created by the circuitry in electronic chassis 29, shown in more detail in FIGURE 2.

Referring now to FIGURE 2, there is shown a cross-section of the table 9, the detector assembly 16, and the component circuitry in the electronic chassis 29. A lead collimator 41 in the assembly 16 is disposed adjacent the table top 12 and is provided with a plurality of apertures 42 or bores therethrough. Radiation can pass only through the apertures 42. The apertures 42 are focussed on the X-ray source 14, that is, the center lines of the apertures converge at the X-ray source. An X-ray or a gamma ray passing through one of the apertures 42 will create a rapid flash of light in one of the scintillators 43, one scintillator being provided at the lower end of each of the apertures 42. A light flash in any of the scintillators 43 is detected by an associated photomultiplier tube 44, one tube being optically coupled to each scintillator. The photomultiplier tubes 44 respond to a flash of light in the scintillator by producing a very fast electrical pulse.

Although thousands of gamma rays and X-rays are detected in the course of a single scan, the proper operation of the scanner depends upon having only one flash of light or scintillation detected at a time. The individual scintillations are of such short duration that coincidence between two or more scintillations occurs comparatively infrequently.

The fast electrical pulses from the photomultiplier tubes 44 are used to drive both Z-axis (intensity control) and X-axis (horizontal deflection control) signals for the electron beams in a dual beam cathode-ray oscilloscope 46. The dual beam oscilloscope 46 has two separate electron gun assemblies in the same envelope and each beam impinges differing portions of the screen of the cathode-ray tube. In the present invention, identical deflection potentials are applied to each of the electron beams, but the intensity of the beam from each electron gun is controlled by a different intensity control signal.

The intensity control signals for the two electron beams are obtained from an addition circuit 47 which receives signals from all the photomultiplier tubes 44 and combines the signals into a single Z-axis output signal. Such Z-axis signal will be comprised of pulses from all the photomultipliers 44, the pulses being produced by detection of both gamma rays and X-rays in the scintillators 43. However, the gamma rays will have a higher energy than the soft X-rays obtained from X-ray source 14, therefore, the intensity of the light in a scintillator 43 and the amplitude of the resultant photomultiplier 44 output pulses will be characteristically higher for the gamma rays than for the X-rays. Thus pulses originated by the X-rays can be separated from pulses originated by gamma rays by a pair of pulse height selectors. A first pulse height selector 48 receiving output pulses from addition circuit 47 passes only pulses having amplitudes falling in the range of amplitudes produced by the X-rays. A second pulse height selector 49 also receives output pulses from the addition circuit 47 and passes only pulses having amplitudes falling in the range produced by gamma rays. A typical pulse height selector circuit of the type used in the present invention is described in the text Milli-microsecond Pulse Techniques by Lewis and Wells, 1959, Pergamon Press, New York, pages 293–295.

Output pulses from the pulse height selector 48 are coupled to intensity control terminal $Z_1$ for one of the electron guns in the cathode-ray-oscilloscope while output pulses from the pulse selector 49 are coupled to intensity control terminal $Z_2$ for the other electron gun. Ordinarily, both electron guns are biased off, but a pulse from one of the pulse height selectors 48 and 49 will turn one electron gun on and a spot of light will appear on the screen 51 of the cathode-ray-oscilloscope 46. Thus, for example, when an X-ray is detected, a spot of light is produced in a region 52 on screen 51 while a detected gamma ray causes a spot of light in region 53.

As previously mentioned, identical X and Y deflection signals are applied to both electron guns of oscilloscope 46. The X deflection signal is derived in a position circuit 54 as shown in FIGURE 3. Referring to FIGURE 3, a plurality of monostable multivibrators 61 are each connected to one of the photomultiplier tubes 44, the multivibrators being connected to the photomultiplier tubes in the order of the physical position thereof along the line of detectors. An input pulse 62 applied to a multivibrator circuit 61 will trigger the multivibrator and an output pulse 63 of standard amplitude and duration will be produced. That is, input pulses with widely differing amplitudes will result in multivibrator output pulses having a single standard amplitude. The output pulse signals from the multivibrators 61 are coupled through a resistive voltage divider 64 to the horizontal deflection input of the oscilloscope 46. One end 68 of the divider is connected to the oscilloscope 46, while the other end is connected through bias potential battery 66 to ground neutral, thus providing a reference potential for the beam positioning pulses. The output pulses of the monostable multivibrators 61 are connected at spaced intervals along the voltage divider 64 so that differing amplitudes of pulses from the various multivibrators are coupled to the oscilloscope 46. Therefore, when a pulse is received from a photomultiplier tube 44, an output pulse is produced having an amplitude which is correlated to the physical location of the particular photomultiplier tube 44 from which the pulse was received. Thus, a pulse from a photomultiplier tube on one side of the detector assembly 16 would result in a horizontal position pulse of low amplitude while a pulse from a photomultiplier tube on the opposite side would result in a horizontal position pulse of high amplitude, and pulses from intermediate photomultiplier tubes result in horizontal position pulses of linearly intermediate amplitudes. A position circuit output pulse is coupled to the horizontal deflection plates of the oscilloscope 46 so that the electron beams are deflected horizontally to a position corresponding to the spatial position of the photomultiplier tube from which the pulse was received.

The vertical Y position control for the electron beams is obtained in the oscilloscope 46 from a sweep circuit 56, the rate of change of such sweep corresponding to the movement of the detector assembly 16. The vertical sweep circuit 56 and the operation of the motor 22 are simultaneously activated by the control switch 31. Thus, if the detector assembly 16 completes a scan in ten minutes, then the vertical sweep circuit 56 should provide a signal having a ten minute long sawtooth waveform.

In operation, when a gamma ray or an X-ray enters one of the scintillators 43, a flash of light is created which is detected by the corresponding photomultiplier tube 44. The resulting output pulse from the tube 44 is received by the position circuit 54, which provides a horizontal position pulse to the oscilloscope 46. A vertical position signal is already present from the sweep circuit 56, the position signals being applied to the deflection plates of both electron guns in the oscilloscope 46, however, only one electron beam is turned on at a time, depending upon whether the detected radiation was a gamma ray or an X-ray. Thus, the two images 52 and 53 on the oscilloscope 46 are created by a composite of many individual spots of light which occur one at a time during the scanning period. Therefore, a camera 57, focussed on the screen 51, is set for a time exposure during the scanning period to combine many points of light into a composite image. Ordinarily a scanning period may last anywhere from one minute to two hours, depending upon the intensity of the radiation available and the detail desired. The resulting photographic images may then be observed separately or superimposed as previously discussed.

Obviously, many variations in physical construction are possible. Another embodiment of the invention shown in FIGURE 4 utilizes some of the possible variations. The subject reclines on a table 71, the table being provided with wheels 72 so that it may be moved relative to a stationary detector assembly 73. A plurality of apertures 74 are provided in a lead collimator 76 disposed adjacent the bottom surface of the table 71 at the top of the detector assembly 73, the apertures 74 each having a corresponding scintillator 77 and photomultiplier 78. The apertures 74 are arranged in four staggered rows transverse to the long dimension of the table 71. Such an arrangement of the apertures 74 may be necessary if the size of the various scintillators 77 and tubes 78 precludes sufficiently close spacing in a single line. The regions scanned by the four rows of detectors are interlaced so that the resulting images can provide greater detail than is possible with a single row. Pulses resulting from detected radiation are coupled through a cable 75 to an electronic chassis 80 in which the gamma ray and X-ray created pulses are separated by pulse height analyzers and positioning signals are developed. Such signals are applied to a dual beam oscilloscope 79, the screen of which is viewed by a special camera 81 as will be subsequently discussed.

A control chassis 82 may be provided to coordinate the operation of the various components of the invention, such chassis controlling the actuation of an X-ray source 83 disposed above the table 71 and the actuation of the electronic chassis 80. A drive motor 85 has a pulley 84 upon which is wound a line 86 for moving the table 71 across the detector assembly 73 to provide a scan of a subject on the table. Actuation of the drive motor 85 is initiated from the control chassis 82. A selsyn or self-synchronous motor 87 is mechanically coupled to the drive motor 85, the rotary position of which is transmitted to a film drive repeater motor 88 which is mechanically coupled to the film drive in the camera 81.

In the operation of the apparatus of FIGURE 4, the X-ray source is actuated while the table 71 (with the subject) is slowly moved across the detector assembly. The film in the camera 81 is moved in synchronism with the table 71 through the control provided by the selsyn motors 87–88, thus eliminating the necessity for a vertical sweep circuit 56 as utilized with the embodiment of the invention as shown in FIGURES 1–3. When radiation is detected by one of the detectors 77, the electronic chassis 80 deflects the oscilloscope beams vertically by a distance corresponding to the row in which the particular detector 77 is located, thus correcting for the longitudinal displacement of the rows of detectors 77. As in the previously described embodiment of the invention two images of gamma ray radiation and X-ray radiation are provided side-by-side on the film in the camera 81.

Therefore, while the invention has been disclosed with respect to particular embodiments, it will be apparent to those skilled in the art that numerous variations and modifications may be made within the spirit and scope of the invention and it is not intended to limit the invention except as defined in the following claims.

What is claimed is:

1. In a scanner obtaining an image of bodily structure concurrently with an image of gamma ray emitting isotope distribution in a subject, the combination comprising a source of X-rays disposed on one side of said subject, a radiation detector disposed on the opposite side of said subject from said X-ray source, said detector being responsive to both gamma rays and X-rays, means distinguishing between gamma ray and X-ray radiation detected by said detector, means forming separate images of X-ray and gamma ray radiation detected by said detector.

2. In a scanner obtaining an image of bodily structure concurrently with an image of gamma ray emitting isotope distribution in an invivo subject, the combination comprising a source of X-rays disposed on one side of said subject, an array of directional radiation detectors disposed along a first axis on an opposite side of said subject, means changing the relative position of said detectors with respect to said subject transversely to said axis, position detecting circuits producing position potentials according to the location at which gamma rays and X-rays are detected by said detectors, pulse height selectors responsive to energy differences between said gamma rays and said X-rays detected at said detectors and providing first and second output signals responsive to such differences, and first and second image producing means each receiving said position potentials, said first image means being activated by said first output signal and said second image means being activated by said second output signal.

3. In a scanner obtaining an image of bodily skeletal structure concurrently with an image of gamma ray emitting isotope distribution in a subject, the combination comprising a source of X-rays disposed on one side of said subject, a radiation detector receiving X-ray and gamma ray radiation and disposed on the opposite side of said subject from said X-ray source, a pair of pulse height selectors distinguishing between said X-ray and said gamma ray radiations detected by said detector, first image means coupled to said detector and a first of said pulse height selectors and deriving an image of gamma ray emanations from said body, and second image means coupled to said detector and a second of said pulse height selectors and deriving a second image of X-rays passing through said subject.

4. A scanner as described in claim 3 further characterized in that said detector is movable with respect to said subject.

5. In an isotope scanner for obtaining an image of bodily skeletal structure simultaneously with an image of the gamma ray emitting isotope distribution in a subject, the combination comprising a source of X-rays disposed on one side of said subject and providing X-rays in an energy range differing from the energy range of said gamma rays, a plurality of radiation detectors disposed in a line on the opposite side of said subject, a drive system changing the position of said detectors relative to said subject in a direction transverse to said line, a first pulse height selector coupled to the outputs of said detectors and passing only pulses having an amplitude corresponding to the energy of said X-rays, a second pulse height selector coupled to the outputs of said detectors and passing only pulses having an amplitude corresponding to the energy of said gamma rays, a first coordinate position detecting circuit coupled to the output of said radiation detectors and deriving the position coordinate of detected radiation, means deriving a second position coordinate transverse to said first coordinate and coupled to said drive system, an X-ray image producing means coupled to said first pulse height selector and to said position circuit and said means deriving, a gamma ray image producing means coupled to said second pulse height selector and to said position circuit and said means deriving.

6. In an isotope scanner as described in claim 5, the further combination of a collimated radiation shield disposed between said detectors and said subject, said shield having a plurality of apertures each aperture being aligned between said source of X-rays and with one of said detectors.

7. An isotope scanner as described in claim 5, wherein said position circuit produces a first coordinate signal having an amplitude related to the position along said line of detectors at which radiation is detected, said means deriving having a second coordinate signal related to the position of said line of detectors along said subject.

8. An isotope scanner as described in claim 5, wherein both said X-ray image and said gamma ray image producing means are a cathode-ray oscilloscope, said oscilloscope having beam deflection plates receiving coordinate signals from said position circuit and said means deriving, said oscilloscope having beam intensity controls each receiving control signals from said first and second pulse height selectors, and further characterized in that an image storage means is provided for retaining images formed on the screen of said oscilloscope.

9. In an isotope scanner providing an image of bodily skeletal structure simultaneously with an image of the gamma-ray emitting isotope distribution in a subject, the combination comprising a generator of long wavelength X-rays disposed on one side of said subject, a multi-apertured radiation shield disposed on the opposite side of said subject, said apertures being in a straight line and each having a centerline directed at said X-ray source, a plurality of radiation detectors disposed on the opposite side of said subject, one each being exposed to radiation passing through one of said apertures, means moving said shield and said detectors transversely to said line of apertures, a first pulse height selector coupled to the outputs of said detectors and passing only pulses having a range of amplitudes corresponding to that produced by radiation from said X-ray source, a second pulse height selector coupled to the outputs of said detectors and passing only pulses having a range of amplitudes corresponding to that produced by said gamma rays, position circuitry for producing deflection potentials according to the energization of said detectors, at least one oscilloscope having beam deflection plates receiving said deflection potentials and having a pair of beam intensity controls each coupled to the outputs of one of said first and said second pulse height selectors, and means storing images formed on said oscilloscope.

10. An isotope scanner as described in claim 9, wherein said image storing means is a camera focussed on said oscilloscope.

11. In an isotope scanner for providing an image of bodily skeletal structure simultaneously with an image of gamma ray emitting isotope distribution in a subject, the combination comprising a source of X-rays disposed on one side of said subject, an array of radiation detectors disposed on the opposite side of said subject from said X-ray source, a multi-apertured radiation shield disposed between said radiation detectors and said subject, each of said apertures being aligned between one of said radiation detectors and said X-ray source, means moving said subject relative to said detectors, a first pulse height analyzer receiving output signals from said detectors and passing only signals within a range of amplitudes corresponding to that produced by radiation from said X-ray source, a second pulse height selector receiving signals from said detectors and passing only output signals within a range of amplitudes corresponding to that produced by said gamma rays, position circuitry producing signals related to location at which radiation is detected, X-ray image producing means coupled to said position circuitry and to said first pulse height analyzer, gamma ray image producing means coupled to said position circuitry and to said second pulse height analyzer.

References Cited

UNITED STATES PATENTS

| | | | |
|---|---|---|---|
| 2,776,377 | 1/1957 | Anger | 250—71.5 |
| 3,057,998 | 10/1962 | West | 250—83.3 |

OTHER REFERENCES

Techniques for the Visualization of Internal Organs by an Automatic Radioisotope Scanning System, by W. J. MacIntyre et al., contained in International Journal of Applied Radiation and Isotopes, 1958, vol. 3, pp. 193–206.

ROBERT L. GRIFFIN, *Primary Examiner.*

R. K. ECKERT, *Assistant Examiner.*